United States Patent [19]

Beall et al.

[11] Patent Number: 4,996,172

[45] Date of Patent: Feb. 26, 1991

[54] RARE EARTH-CONTAINING ZINC PHOSPHATE GLASSES

[75] Inventors: George H. Beall, Big Flats; James E. Dickinson, Jr.; Candace J. Quinn, both of Corning, all of N.Y.

[73] Assignee: Corning Incorporated, Corning, N.Y.

[21] Appl. No.: 372,764

[22] Filed: Jun. 29, 1989

[51] Int. Cl.[5] .......................... C03C 3/16; C03C 3/17
[52] U.S. Cl. .......................... 501/45; 501/48
[58] Field of Search .................. 501/45, 48

[56] References Cited

U.S. PATENT DOCUMENTS 3,979,322  9/1976  Alexeev et al. ............... 501/45
4,248,732  2/1981  Myers et al. ................... 501/48
4,439,530  3/1984  Tajima ........................... 501/45

*Primary Examiner*—Mark L. Bell

*Attorney, Agent, or Firm*—Clinton S. Janes, Jr.

[57] ABSTRACT

This invention is concerned with the preparation of glasses exhibiting transition temperatures below 450° C., working temperatures below 500° C., and exceptional resistance to mild aqueous alkaline solutions consisting essentially, expressed in terms of mold percent on the oxide basis, of:

| | | | |
|---|---|---|---|
| ZnO | 12–55 | $K_2O$ | 0–25 |
| $P_2O_5$ | 28–40 | $Li_2O + Na_2O + K_2O$ | 10–35 |
| $Li_2O$ | 0–25 | Rare earth metal oxide | 1–5 |
| $Na_2O$ | 0–25 | | |

At least two alkali metal oxides will most desirably be present.

4 Claims, No Drawings

RARE EARTH-CONTAINING ZINC PHOSPHATE GLASSES

BACKGROUND OF THE INVENTION

As was explained in U.S. application Ser. No. 258,675, filed Oct. 17, 1988, now abandoned, in the names of G. H. Beall and C. J. Quinn under the title ZINC-CONTAINING PHOSPHATE GLASSES, extensive research has been conducted to discover inorganic glass compositions demonstrating low transformation or transition temperatures ($T_g$), which property renders it possible to undertake glass batch melting and forming operations at low temperatures. And, as further explained there, because silicate-based glass compositions typically exhibit transition temperatures substantially greater than 450° C. and forming temperatures considerably higher than 800° C., the search for glasses having low transition temperatures has commonly led to the use of $B_2O_3$- and/or $P_2O_5$-based compositions. Unfortunately, however, phosphate-based glass compositions customarily demonstrate much poorer chemical durability than silicate-containing glasses, with the poor durability of those glasses becoming more notable as the transition temperature of the glass is reduced. As conventionally defined, the transition temperature of a glass is considered to be the temperature at which increases in specific heat and coefficient of thermal expansion occur which are accompanied by a sharp drop in viscosity.

Consequently, the principal objective of Ser. No. 258,675 was to devise glass compositions manifesting transition temperatures below 450° C., preferably below 350° C., with working temperatures (temperatures at which the glass displays a viscosity of about $10^4$–$10^7$ poises) below 500° C., preferably between about 350°–450° C., and which demonstrate excellent resistance to chemical attack when exposed to boiling water and mild aqueous alkaline solutions. To achieve that objective, glasses were disclosed consisting essentially, expressed in terms of mole percent on the oxide basis, of 10–35% $R_2O$, wherein $R_2O$ consists of at least two alkali metal oxides in the indicated proportions of 0–25% $Li_2O$, 0–25% $Na_2O$, and 0–25% $K_2O$, 12–55% ZnO, 28–40% $P_2O_5$, and, optionally, up to 35% RO, wherein RO consists of 0–35% PbO and 0–35% SnO. It was observed that at least two alkali metal oxides must be present inasmuch as the inclusion of $Li_2O$ alone risks the possible development of devitrification in the glass; $Na_2O$ alone reduces the chemical durability of the glass or renders it difficult to melt; and $K_2O$ alone raises the $T_g$ of the glass to unacceptable levels. The preferred glasses contained 0.75–6% $Al_2O_3$ and/or 1–8% $B_2O_3$, the total $Al_2O_3+B_2O_3$ not exceeding 8%. The most preferred glasses consisted essentially of 12–25% $R_2O$, wherein $R_2O$ consists of at least two alkali metal oxides in the indicated proportions of 3–12% $Li_2O$, 4–13% $Na_2O$, and 0–12% $K_2O$, 30–49% ZnO, 0–10% SnO, 1–3.5% $Al_2O_3$, 30–36% $P_2O_5$, and 0–5% CaO+MgO+F, wherein the sum of $R_2O+Al_2O_3+ZnO+P_2O_5$ with, optionally, SnO totals at least 85%.

Although an exact conversion of composition intervals expressed in terms of mole percent to ranges defined in terms of weight percent is not mathematically possible, Ser. No. 258,675 provided the following approximate values in weight percent of the broad operable composition area: 5–25% $R_2O$, wherein $R_2O$ consists of at least two alkali metal oxides in the indicated proportions of 0–10% $Li_2O$, 0–15% $Na_2O$, and 0–20% $K_2O$, 6–45% ZnO, 30–57% $P_2O_5$, and, optionally, up to 55% RO, wherein RO consists of 0–50% PbO and 0–40% SnO. In the preferred compositions 0.75–6% $Al_2O_3$ and/or 1–6% $B_2O_3$ will be present, the sum of the two components not exceeding 6%.

Whereas the glasses disclosed in Ser. No. 258,675 demonstrated exceptional chemical durability, especially when it is appreciated that those glasses exhibited $T_g$ values below 450° C., research continued to discover glass compositions displaying the physical properties of those glasses, but wherein the chemical durability could be further enhanced.

Accordingly, the principal objective of the present invention was to develop glasses exhibiting transition temperatures below 450° C., preferably below 350° C., and with working temperatures below 500° C., preferably between about 350°–450° C., but which demonstrate levels of chemical durability, when contacted with mild aqueous solutions, at least ten times better than those exhibited by the glasses of Ser. No. 258,675.

SUMMARY OF THE INVENTION

We have achieved that objective in glasses having base compositions in the $R_2O$-ZnO-$P_2O_5$ system similar to those disclosed in Ser. No. 258,675, but containing $Y_2O_3$ and/or a rare earth metal oxide of the lanthanide series. Hence, our inventive glasses consist essentially, expressed in terms of mole percent on the oxide basis of 10–35% $R_2O$, wherein $R_2O$ consists of at least one alkali metal oxide in the indicated proportion selected from the group consisting of 0–25% $Li_2O$, 0–25% $Na_2O$, and 0–25% $K_2O$, 12–55% ZnO, 28–45% $P_2O_5$, and 0.5–5% total of $Y_2O_3$ and/or at least one oxide of a rare earth metal selected from the lanthanide group ($RE_2O_x$) consisting of lanthanum, cerium, neodymium, praseodymium, promethium, samarium, europium, gadolinium, terbium, dysprosium, holmium, erbium, thulium, ytterbium, and lutecium. PbO and SnO may advantageously be present in individual amounts up to 35%, with the sum of the two components not exceeding 35%. In like manner CaO, MgO, and MnO may be included individually and collectively at concentrations of 10%. $Cu_2O$ may be incorporated at levels up to 15%. We have observed that $Cu_2O$ and MnO appear to have the capability of reducing the $T_g$ of the glass while not concurrently adversely affecting the chemical durability thereof. $ZrO_2$ is an especially interesting additive in that in amounts of 1–5% it operates to develop a uniform white coloration.

The inclusion of at least two alkali metal oxides is greatly to be preferred because the presence of $Li_2O$ alone appears to hazard the development of devitrification in the glass, while $Na_2O$ or $K_2O$ alone tend to raise the $T_g$ of the glass significantly. The preferred glass compositions will also generally contain $Al_2O_3$ in an amount effective to act in conjunction with $Y_2O_3$ and/or rare earth metal oxides to improve the chemical durability of the glass; in particular, the resistance of the glass to attack in an acidic environment. As can be appreciated, any addition of $Al_2O_3$ will have some effect; however, amounts between about 0.5–4% have been found especially suitable.

Finally, additions of other extraneous oxides and fluoride will be held below about 5%.

The most preferred base glass compositions consist essentially of 12–25% $R_2O$, wherein $R_2O$ consists of at least two alkali metal oxides in the indicated proportions selected from the group consisting of 3–12% $Li_2O$, 4–13% $Na_2O$, and 0–12% $K_2O$, 30–49% ZnO, 30–36% $P_2O_5$, and 0.5–5% total of $Y_2O_3$ and/or at least one oxide of a rare earth metal ($RE_2O_x$). An effective amount of $Al_2O_3$ up to 2.5% will desirably be included as will up to 10% SnO and up to 5% individually and collectively of CaO, MgO, and F. The sum of $R_2O+ZnO+P_2O_5+RE_2O_x$ with, optionally, $Al_2O_3$ and SnO will total at least 85% and, preferably, at least 90%.

Although it is not mathematically possible to exactly convert ranges expressed in terms of mole percent to ranges of weight percent, the following values represent the present glass compositions in approximate weight percents: 5–25% $R_2O$, wherein $R_2O$ consists of at least one alkali metal oxide in the indicated proportion selected from the group consisting of 0–10% $Li_2O$, 0–15% $Na_2O$, and 0–20% $K_2O$, 6–45% ZnO, 30–60% $P_2O_5$, and 2–10% of $Y_2O_3$ and/or $RE_2O_x$. In the preferred glasses up to 4% $Al_2O_3$ will be present. Up to 55% RO may be included, wherein RO consists of at least one member of the group in the indicated proportion of 0–50% PbO and 0–40% SnO.

PRIOR ART

Several references relating to the base glass compositions were reviewed in Ser. No. 258,675 and the base glass compositions disclosed in Ser. No. 258,675 distinguished thereover. In general, those references did not mention the presence of $Y_2O_3$ and/or rare earth metal oxides. Accordingly, no consideration of those references will be made here.

U.S. Pat. No. 3,979,322 is directed to glasses particularly suitable for laser applications, those glasses consisting, in mole percent, of 1–30% $R_2O$, 20–45% Group II metal oxides, 0.1–25% rare earth metal oxides, 35–49% $P_2O_5$, and 0–27% of at least one oxide selected from the group of $Al_2O_3$, $B_2O_3$, $Nb_2O_5$, and PbO. There was no discussion of the utility of $Y_2O_3$ and/or rare earth metal oxides to extraordinarily enhance the chemical durability of phosphate-based glasses. Moreover, there was no recognition of the desirability to have at least two alkali metal oxides present and none of the working examples contained two. Finally, the amounts of $P_2O_5$ reported in the working examples were substantially in excess of the maximum operable in the present inventive glasses, as were the levels of alkaline earth metal oxides where included.

U.S. Pat. No. 4,239,645 was also concerned with glasses suitable for laser applications. The glasses consisted, in mole percent, of 10–25% $R_2O$, wherein $R_2O$ consists of 0–25% $Li_2O$, 0–25% $Na_2O$, and 0–8% $K_2O$, 5–15% RO, wherein RO consists of 0–15% BaO, 0–15% CaO, 0–15% MgO, 0–15% SrO, and 0–15% ZnO, 1–15% $Al_2O_3$, 55–70% $P_2O_5$, 0.01–5% $Nd_2O_3$, 0–5% $Y_2O_3$, 0–5% $La_2O_3$, 0–5% $GeO_2$, 0–5% $CeO_2$, 0–3% $Nb_2O_5$, 0–3% MnO, 0–2% $Ta_2O_5$ and 0–1% $Sb_2O_3$. The minimum $P_2O_5$ content exceeds the maximum found operable in the present inventive glasses.

U.S. Pat. No. 4,248,732 was again drawn to laser glasses. The glasses consisted essentially, in mole percent, of 5–40% $R_2O$, 5–30% RO, wherein RO is at least one oxide selected from the group BaO, BeO, CaO, MgO, SrO, and ZnO, 0.01–15% $R_2O_3$, wherein $R_2O_3$ is at least one oxide selected from the group $Al_2O_3$, $B_2O_3$, $Er_2O_3$, $La_2O_3$, $Tm_2O_3$, and $Y_2O_3$, 0.01–5% $Nd_2O_3$, 35–65% $P_2O_5$, and 0.1–10% by weight of a solarization inhibiting oxide selected from the group $CeO_2$, $Nb_2O_5$, $Sb_2O_3$, $SiO_2$ and $TiO_2$. Whereas there is some literal overlap between those ranges and the composition intervals of the present inventive glass, the ranges of the patented glasses are broader and more diverse than can be operable in the present invention. Furthermore, there is no recognition of the desirability for having at least two alkali metal oxides and only two of the 25 individual working examples of the patent contained two; and in one of those the total of the two exceeded the maximum permitted in the instant inventive glasses. ZnO is not a necessary constituent and is included in only 12 of the working examples with six of those compositions containing less ZnO than the minimum demanded in the present inventive glasses. In all but two of the working examples of the patent, the $P_2O_5$ content exceeds the maximum found operable in the current inventive glasses, and in those two examples the $P_2O_5$ concentration is exactly the maximum permitted in the present inventive glasses. Also, the glasses of the patent require a solarization inhibitor, an ingredient not necessary in the present inventive glasses. Finally, none of the working examples of the patent had a composition coming within the ranges demanded for the current inventive glasses.

U.S. Pat. No. 4,439,530 described optical glasses consisting essentially in weight percent, of 3–30% $Na_2O$ and/or $K_2O$, 8–65% PbO, 1–45% $Ta_2O_5$, and 18–38% $P_2O_5$. The patent also recites a large number of optional components in varying components including 0–3% $Al_2O_3$, 0–15% $B_2O_3$, 0–25% ZnO, 0–3% $Li_2O$, 0–3% $Gd_2O_3$, and 0–3% $La_2O_3$. There is no disclosure of the capability of $Y_2O_3$ and/or rare earth metal oxides ($Gd_2O_3$ and $La_2O_3$) for enhancing the chemical durability of phosphate-based glasses. $Ta_2O_5$ is not a necessary constituent of the current inventive glasses. There is no recognition of the desirability of having at least two alkali metal oxides present and none of the working examples of the patent contained two. ZnO is not a necessary ingredient in the glasses of the patent and is included in only one of the working examples therein.

U.S. Pat. No. 4,661,284 disclosed yet another laser glass consisting essentially, in mole percent, of 40–70% $P_2O_5$, 5–35% $SiO_2+B_2O_3$, consisting of 0–20% $SiO_2+$ 5–20% $B_2O_3$, 5–20% $Li_2O+Na_2O+K_2O$, 3–10% $La_2O_3+Nd_2O_3$, and 0–10% $MgO+CaO+SrO+BaO+ZnO$. There is no recognition of the desirability of having at least two alkali metal oxides and none of the working examples contained two. ZnO is an optional ingredient only and, if present, is included in amounts below the minimum demanded in the instant inventive glasses. The range of $P_2O_5$ generally exceeds the maximum permitted in the current inventive glasses.

U.S. Pat. No. 4,771,020 is directed to optical glasses consisting essentially, in weight percent, of 25–65% $P_2O_5+GeO_2$, consisting of 5–65% $P_2O_5$ and 0–55% $GeO_2$, 0.5–65% $Sb_2O_3+Bi_2O_3$, 34–74% $Sb_2O_3+Bi_2O_3+PbO$, consisting of 0–50% $Sb_2O_3$, 0–25% $Bi_2O_3$ and 0–63% PbO, 1–15% $Y_2O_3+La_2O_3+Gd_2O_3+Yb_2O_3+Lu_2O_3+Ga_2O_3+In_2O_3Al_2O_3$, consisting of 0–10% $Y_2O_3$, 0–10% $La_2O_3$, 0–15% $Gd_2O_3$, 0–10% $Yb_2O_3$, 0–10% $Lu_2O_3$, 0–10% $Ga_2O_3$, 0–15% $In_2O_3$, and 0–5% $Al_2O_3$, 0–10% $Li_2O+Na_2O+K_2O+Cs_2O$, 0–20% $MgO+CaO+SrO+BaO$, 0–20% ZnO, 0–10% $As_2O_3$ and 0–10% F. There is no recognition of the desirability of having at least two alkali metal oxides included and no working example had two. In the two working examples which contain one alkali metal oxide, the level thereof is less than the minimum needed in the current inventive glasses. Neither $Sb_2O_3$ nor $Bi_2O_3$ is a required component in the present inventive glasses. Finally, none of the working examples even closely approaches the composition intervals required in the instant inventive glasses.

DESCRIPTION OF PREFERRED EMBODIMENTS

Table I reports a number of glass compositions, expressed in terms of mole present on the oxide basis, illustrating the compositional parameters of the present invention. Table IA lists the same glasses, but wherein the compositions have been converted to weight percent.

The actual batch ingredients for the glasses can comprise any materials, either the oxides or other compounds, which, upon being melted together, will be transformed into the desired oxide in the proper proportions. To illustrate, $Li_2CO_3$ is conveniently utilized as the source of $Li_2O$. In Examples 8-14 the mineral bastnasite was incorporated to provide a combination of rare earth metal oxides ($RE_2O_x$).

Two grades of bastnasite were purchased from Molycorp, Inc., White Plains, N.Y. According to the manufacturer's assay, Bastnasite No. 4000 has the following approximate analysis, in weight percent:

| | | | | |
|---|---|---|---|---|
| $CeO_2$ | 30 | Impurities: | SrO | 6 |
| $La_2O_3$ | 20 | | CaO | 5 |
| $Nd_2O_3$ | 7 | | BaO | 2 |
| $Pr_6O_{11}$ | 2.4 | | $SiO_2$ | 2 |
| Other rare earths | 0.6 | | $P_2O_5$ | 1 |
| | 60.0 | | F | 6 |
| | | Loss on ignition (1000° C.) | | ≈20 |

A purer grade of bastnasite, viz., Bastnasite No. 4100 wherein the mineral has been calcined and leached, has the following approximate analysis according to the manufacturer's assay:

| | | | | |
|---|---|---|---|---|
| $CeO_2$ | 44 | Impurities: | SrO | 1.2 |
| $La_2O_3$ | 29 | | CaO | 2.2 |
| $Nd_2O_3$ | 10 | | BaO | 3.3 |
| $Pr_6O_{11}$ | 4 | | $P_2O_5$ | 1.5 |
| Other rare earths | 0.9 | | F | 7 |
| | ≈88 | | | |

Bastnasite No. 4000 was used in Examples 8-11 and Bastnasite No. 4100 was utilized in Examples 12-14.

Because it is not known with which cation(s) it is combined and because the amount included as a component of bastnasite was quite small, the fluoride content is merely reported in terms of F.

The batch materials were compounded, thoroughly mixed together via ballmilling to assist in securing a homogeneous melt, and then charged into silica crucibles. After placing lids thereon, the crucibles were moved into a furnace operating at about 1200°–1300° C. and maintained at that temperature for about 4–6 hours. Each melt was poured into a steel mold to produce a rectangular glass slab having dimensions of about 8"×4"×0.5" and the glass slab immediately transferred to an annealer operating at a temperature of about 300°–325° C.

Rectangular tab-shaped pieces weighing about 30–40 grams were cut from the annealed slabs and heated in cups shaped from aluminum foil to temperatures within the range of about 350°–450° C., and glass cane was handdrawn from each cup to obtain a close approximation of the working temperature of the glass.

Whereas the above description reflects laboratory melting and forming only, it will be appreciated that the inventive glasses are capable of being melted in large scale melting units and shaped into articles of desired geometries utilizing techniques conventional in the glass making art. Hence, in accordance with standard practice, it is only necessary that the batch materials be thoroughly mixed together, the batch then melted at temperatures assuring a homogeneous melt, that melt thereafter cooled and simultaneously shaped into a glass article of a desired configuration, and that shape will customarily be annealed.

TABLE I

| | (Mole %) | | | | | | | | | |
|---|---|---|---|---|---|---|---|---|---|---|
| | 1 | 2 | 3 | 4 | 5 | 6 | 7 | 8 | 9 | 10 |
| $P_2O_5$ | 33 | 33 | 34.7 | 34.7 | 34.7 | 34.7 | 34.7 | 33 | 33 | 33 |
| ZnO | 43 | 40 | 44.6 | 44.6 | 44.6 | 44.6 | 44.6 | 41 | 43 | 44 |
| $Li_2O$ | 6 | 7 | 6.1 | 6.1 | 6.1 | 6.1 | 6.1 | 6 | 6 | 5 |
| $Na_2O$ | 7 | 8 | 7.1 | 7.1 | 7.1 | 7.1 | 7.1 | 7 | 7 | 7 |
| $K_2O$ | 7 | 5 | 5.4 | 5.4 | 5.4 | 5.4 | 5.4 | 7 | 7 | 7 |
| $Al_2O_3$ | 2 | 2 | — | — | — | — | — | — | 1 | 2 |
| $SiO_2$ | 2 | — | — | — | — | — | — | — | 2 | — |
| $La_2O_3$ | — | — | 2 | — | — | — | — | — | — | — |
| $Nd_2O_3$ | — | — | — | — | — | 2 | — | — | — | — |
| $Ce_2O_4$ | — | — | — | 2 | — | — | — | — | — | — |
| $TiO_2$ | — | — | — | — | — | — | — | — | — | 1 |
| $\frac{1}{3}Pr_6O_{11}$ | — | — | — | — | 2 | — | — | — | — | — |
| $Er_2O_3$ | — | — | — | — | — | — | 2 | — | — | — |
| SnO | — | 5 | — | — | — | — | — | — | — | — |
| $RE_2O_x$* | — | — | — | — | — | — | — | 0.6 | 0.6 | 0.6 |
| F | — | — | — | — | — | — | — | 0.1 | 0.1 | — |

| | 11 | 12 | 13 | 14 | 15 | 16 | 17 | 18 | 19 | 20 |
|---|---|---|---|---|---|---|---|---|---|---|
| $P_2O$ | 33.5 | 33 | 33 | 33 | 34.6 | 32.7 | 34.7 | 40.2 | 34.7 | 34.0 |
| ZnO | 44.5 | 45 | 43 | 45 | 46.1 | 44.4 | 33.6 | 41.2 | 44.6 | 44.0 |
| $Li_2O$ | 5 | 9 | 7 | — | 5.2 | 7.1 | 5.1 | 4.7 | 6.1 | 6.8 |
| $Na_2O$ | 7 | 9 | 7 | 19 | 7.2 | 8.1 | 8.2 | 4.7 | 7.1 | 7.0 |
| $K_2O$ | 7 | 1 | 5 | — | 5.5 | 6.2 | 6.2 | 6.6 | 5.4 | 5.2 |
| $Al_2O_3$ | 1.5 | 2 | 2 | 2 | — | — | 1.0 | 0.8 | — | 1.5 |
| $SiO_2$ | — | — | 2 | — | — | — | — | — | — | — |
| $Ce_2O_4$ | — | — | — | — | 1.5 | 1.5 | 1.0 | 1.8 | 2.0 | 1.5 |
| $TiO_2$ | — | — | — | — | — | — | — | — | — | — |

TABLE I-continued

| | | | | | | | | | | |
|---|---|---|---|---|---|---|---|---|---|---|
| PbO | — | — | — | — | — | — | 10.2 | — | — | — |
| $RE_2O_x$* | 1.5 | 1 | 1 | 1 | — | — | — | — | — | — |
| $Y_2O_3$ | — | — | — | — | — | — | — | — | 2.0 | — |

*Mixture of rare earth oxides found in bastnasite

TABLE IA (Weight %)

| | 1 | 2 | 3 | 4 | 5 | 6 | 7 | 8 | 9 | 10 |
|---|---|---|---|---|---|---|---|---|---|---|
| $P_2O_5$ | 48.0 | 46.9 | 46.7 | 48.2 | 46.7 | 46.6 | 46.2 | 45.6 | 46.8 | 46.3 |
| ZnO | 35.8 | 32.5 | 34.7 | 35.7 | 34.6 | 34.6 | 34.3 | 32.5 | 35.8 | 35.3 |
| $Li_2O$ | 1.8 | 2.1 | 1.7 | 1.8 | 1.7 | 1.7 | 1.7 | 1.8 | 1.8 | 1.5 |
| $Na_2O$ | 4.4 | 5.0 | 4.2 | 4.3 | 4.2 | 4.2 | 4.2 | 4.2 | 4.3 | 4.3 |
| $K_2O$ | 6.7 | 4.7 | 6.4 | 6.6 | 6.4 | 6.4 | 6.3 | 5.4 | 6.6 | 6.5 |
| $Al_2O_3$ | 2.1 | 2.0 | — | — | — | — | — | 1.9 | 1.0 | 2.0 |
| $SiO_2$ | 1.2 | — | — | — | — | — | — | 0.1 | 1.3 | 0.1 |
| $La_2O_3$ | — | — | 6.3 | — | — | — | — | 0.7 | 0.7 | 0.7 |
| $Nd_2O_3$ | — | — | — | — | — | 6.5 | — | 0.2 | 0.2 | 0.2 |
| $CeO_2$ | — | — | — | 3.4 | — | — | — | 1.0 | 1.0 | 1.0 |
| $Pr_6O_{11}$ | — | — | — | — | 6.4 | — | — | 0.1 | 0.1 | 0.1 |
| $Er_2O_3$ | — | — | — | — | — | — | 7.3 | — | — | — |
| SnO | — | 6.7 | — | — | — | — | — | 5.3 | — | — |
| SrO | — | — | — | — | — | — | — | 0.2 | 0.2 | 0.2 |
| CaO | — | — | — | — | — | — | — | 0.2 | 0.2 | 0.2 |
| BaO | — | — | — | — | — | — | — | 0.1 | 0.1 | 0.1 |
| F | — | — | — | — | — | — | — | 0.2 | 0.2 | 0.2 |
| $TiO_2$ | — | — | — | — | — | — | — | — | — | 0.8 |
| $RE_2O_x$ | — | — | — | — | — | — | — | ≈2.0 | ≈2.0 | ≈2.0 |

| | 11 | 12 | 13 | 14 | 15 | 16 | 17 | 18 | 19 | 20 |
|---|---|---|---|---|---|---|---|---|---|---|
| $P_2O_5$ | 46.3 | 48.0 | 47.1 | 46.6 | 47.6 | 46.0 | 42.3 | 53.3 | 48.6 | 47.3 |
| ZnO | 35.3 | 37.5 | 35.1 | 36.3 | 36.4 | 35.8 | 23.5 | 31.4 | 35.8 | 35.1 |
| $Li_2O$ | 1.5 | 2.8 | 2.1 | — | 1.5 | 2.1 | 1.3 | 1.3 | 1.8 | 2.0 |
| $Na_2O$ | 4.2 | 5.7 | 4.3 | 11.7 | 4.3 | 5.0 | 4.3 | 3.8 | 4.3 | 4.3 |
| $K_2O$ | 6.4 | 0.5 | 4.7 | — | 5.0 | 5.8 | 5.0 | 4.3 | 5.0 | 4.8 |
| $Al_2O_3$ | — | 2.0 | 2.0 | 2.0 | — | — | 0.9 | 0.7 | — | — |
| $SiO_2$ | 0.2 | 0.1 | 1.3 | 0.1 | — | — | — | — | — | — |
| $La_2O_3$ | 1.5 | 1.1 | 1.1 | 1.1 | — | — | — | — | — | — |
| $Nd_2O_3$ | 0.5 | 0.4 | 0.4 | 0.4 | — | — | — | — | — | — |
| $CeO_2$ | 2.3 | 1.8 | 1.7 | 1.7 | 5.1 | 5.2 | 3.0 | 5.2 | — | 5.0 |
| $Pr_6O_{11}$ | 0.2 | 0.2 | 0.2 | 0.2 | — | — | — | — | — | — |
| SrO | 0.5 | 0.05 | 0.05 | 0.05 | — | — | — | — | — | — |
| CaO | 0.4 | 0.09 | 0.09 | 0.09 | — | — | — | — | — | — |
| BaO | 0.2 | 0.13 | 0.13 | 0.13 | — | — | — | — | — | — |
| F | 0.5 | 0.28 | 0.28 | 0.28 | — | — | — | — | — | — |
| PbO | — | — | — | — | — | — | 19.6 | — | — | — |
| $RE_2O_x$* | ≈4.5 | ≈3.5 | ≈3.4 | ≈3.4 | — | — | — | — | — | — |
| $Y_2O_3$ | — | — | — | — | — | — | — | — | 4.4 | — |

*Total of rare earth oxides contributed by bastnasite

Rectangular samples having the approximate dimensions of either 50×50×7 mm or 35×25×15 mm were cast or cut from each annealed glass slab, some of which were thereafter ground and polished for testing the chemical durability thereof. Inasmuch as one application envisioned for the inventive glasses is their use in the production of cookware, the resistance of the glasses to attack by mild alkaline solutions, such as will be encountered in dishwasher detergents, was deemed to be critical. Accordingly, the surface area of each sample was carefully measured, the sample weighed, and then immersed into a bath operating at 75° C. of a 0.3% by weight aqueous solution of SUPER SOILAX detergent marketed by Economic Laboratories, St. Paul, Minn., the solution exhibiting a pH of about 10. After a dwell period of 24 hours, the sample was removed from the bath, dried in the ambient environment, and reweighed to determine any loss of weight. The weight loss per unit area was thereafter calculated and expressed in terms of $mg/cm^2$. The $T_g$ of the glasses was measured employing standard differential scanning calorimetry techniques.

Table II records the absolute percent weight loss and the weight loss per unit surface area determined in the SUPER SOILAX test (SUPER), the $T_g$ of the glass expressed in terms of °C., and the working temperature of the glass in terms of °C., as estimated in the above-described cane pulling procedure (PULL).

TABLE II

| SUPER | 1 | 2 | 3 | 4 | 5 | 6 |
|---|---|---|---|---|---|---|
| % loss | 0.233 | 0.125 | 0.013 | 0.0062 | 0.0052 | 0.021 |
| $mg/cm^2$ | 2.71 | 1.52 | 0.16 | 0.08 | 0.08 | 0.31 |
| $T_g$ | 344 | 325 | 325 | 321 | 325 | 325 |
| PULL | 425 | 410 | — | — | — | — |
| SUPER | 7 | 8 | 9 | 10 | 11 | 12 | 13 |
| % loss | 0.021 | 0.16 | 0.11 | 0.13 | — | 0.19 | 0.030 |
| $mg/cm^2$ | 0.31 | 1.86 | 1.27 | 1.24 | 1.24 | 1.32 | 0.52 |
| $T_g$ | — | 339 | 352 | 352 | 364 | 364 | 350 |
| PULL | — | 423 | 450 | 460 | 450 | — | 435 |
| SUPER | 14 | 15 | 16 | 17 | 18 | 19 | 20 |
| % loss | 0.065 | 0.029 | 0.067 | 0.059 | 0.152 | 0.0086 | — |
| $mg/cm^2$ | 0.82 | 0.31 | 0.92 | 1.13 | 1.25 | 0.78 | — |
| $T_g$ | — | 352 | 340 | 332 | — | — | 345 |
| PULL | 450 | — | — | — | — | 450 | 430 |

The extraordinary improvement in resistance to alkaline attack imparted to the base glass compositions through the inclusion of $Y_2O_3$ and/or the lanthanide rare earth metal oxides is immediately apparent through a comparison of Example 1 with Examples 3–20. Hence, Examples 4 and 5 demonstrate a thirty fold improvement, Example 3 a 15 fold improvement, and Examples 6, 7, and 15 an eight fold improvement. The least improvement was about two fold. And this tremendous enhancement in chemical durability does not require a sacrifice in the melting and forming properties of the base glasses. Thus, the viscosity relationships demonstrated by the inventive glasses at relatively low working temperatures permit them to be shaped into articles of complex geometries through extrusion, injection molding, and the techniques conventionally utilized in the organic plastic forming art. The glasses containing $CeO_2$ as the rare earth metal oxide appear to provide the best all around combination of chemical durability and physical properties.

We claim:

1. A glass exhibiting a transition temperature below 350° C., a working temperature below 450° C., and exceptional resistance to attack by mild aqueous alkaline solutions consisting essentially, expressed in terms of mole percent on the oxide basis, of:

| | | | |
|---|---|---|---|
| $LiO_2O$ | 0–25 | $P_2O_5$ | 28–45 |
| $Na_2O$ | 0–25 | $Al_2O_3$ | 0–4 |
| $K_2O$ | 0–25 | $SnO$ | 0–35 |
| $Li_2O + Na_2O + K_2O$ | 10–35 | $PbO$ | 0–35 |
| $ZnO$ | 30–55 | $SnO + PbO$ | 0–35 |

$Y_2O_3$ and/or at least one rare earth metal oxide ($RE_2O_x$) 0.5–5 wherein at least two alkali metal oxides are present.

2. A glass according to claim 1 wherein said $Al_2O_3$ is present in an amount of at least 0.5%.

3. A glass according to claim 1 consisting essentially of

| | | | |
|---|---|---|---|
| $Li_2O$ | 3–12 | $ZnO$ | 30–49 |
| $Na_2O$ | 4–13 | $P_2O_5$ | 30–36 |
| $K_2O$ | 0–12 | $Al_2O_3$ | 0–2.5 |
| $Li_2O + Na_2O + K_2O$ | 12–25 | $SnO$ | 0–10 |

$Y_2O_3$ and/or at least one rare earth metal oxide ($RE_2O_x$) 0.5–5.

4. A glass according to claim 3 wherein the sum of $R_2O + ZnO + P_2O_5 + Al_2O_3 + SnO + Y_2O_3$ and/or $RE_2O_x$ totals at least 85%.

* * * * *